United States Patent
Christy et al.

(10) Patent No.: US 11,969,963 B2
(45) Date of Patent: Apr. 30, 2024

(54) LIGHT-WEIGHT, HIGHLY-CONDUCTIVE REPAIR MATERIAL

(71) Applicant: GENERAL NANO LLC, Cincinnati, OH (US)

(72) Inventors: Larry Allen Christy, Cincinnati, OH (US); Joseph E. Sprengard, Cincinnati, OH (US); Thomas J. Sorenson, Cottonwood Heights, UT (US)

(73) Assignee: General Nano LLC, Cincinnati, OH (US)

( * ) Notice: Subject to any disclaimer, the term of this patent is extended or adjusted under 35 U.S.C. 154(b) by 255 days.

(21) Appl. No.: 17/160,671

(22) Filed: Jan. 28, 2021

(65) Prior Publication Data

US 2021/0402720 A1 Dec. 30, 2021

Related U.S. Application Data

(60) Provisional application No. 62/966,772, filed on Jan. 28, 2020.

(51) Int. Cl.
*B29C 73/10* (2006.01)
*B64D 45/02* (2006.01)
(Continued)

(52) U.S. Cl.
CPC ............. *B29C 73/10* (2013.01); *B64D 45/02* (2013.01); *B64F 5/40* (2017.01); *B29L 2031/3076* (2013.01)

(58) Field of Classification Search
CPC .................................. B64D 45/02; B64F 5/40
See application file for complete search history.

(56) References Cited

U.S. PATENT DOCUMENTS 4,169,911 A 10/1979 Yoshida et al.
4,522,889 A 6/1985 Ebnerth et al.
(Continued)

FOREIGN PATENT DOCUMENTS

CN 1130223 A 9/1996
EP 0 109 638 5/1984
(Continued)

OTHER PUBLICATIONS

[NPL-1] TFP Ltd., "Optimat® 20404E Nickel Coated Carbon Mat Technical Data Sheet", Technical Fibre Products, Inc.; Jan. 2015. (Year: 2015).*

(Continued)

*Primary Examiner* — David Sample
*Assistant Examiner* — Donald M Flores, Jr.
(74) *Attorney, Agent, or Firm* — Daniel F. Nesbitt; Nesbitt IP LLC

(57) ABSTRACT

A light-weight, highly-conductive material useful for repairing a lightning protection system in an aircraft. The material includes a nonwoven carbon fiber veil and a metal coating covering the veil. The veil includes a plurality of carbon fibers looped randomly throughout the veil and a binder material that binds the plurality of fibers together. The metal coating covers a portion of a surface of the plurality of bound fibers of the veil, and preferably the entire surface of both the plurality of bound fibers and the binder material, forming a highly-conductive network that follows the shape of the plurality of fibers in the veil. The areal weight is in a range from at least 5 grams per square meter (gsm), up to 12 gsm, and the sheet resistance is in a range from at least 0.5 ohms per square ($\Omega/\Box$), up to $2\Omega/\Box$.

20 Claims, 10 Drawing Sheets

(51) Int. Cl.
*B64F 5/40* (2017.01)
*B29L 31/30* (2006.01)

(56) References Cited

U.S. PATENT DOCUMENTS

| | | | |
|---|---|---|---|
| 4,546,033 | A | 10/1985 | Tsuchimoto et al. |
| 4,752,415 | A | 6/1988 | Iwaskow et al. |
| 6,758,924 | B1 | 7/2004 | Guijt |
| 7,208,115 | B2 | 4/2007 | Sheridan et al. |
| 8,231,751 | B2 | 7/2012 | Ackerman et al. |
| 8,246,770 | B2 | 8/2012 | Ackerman et al. |
| 2005/0039937 | A1 | 2/2005 | Yeh et al. |
| 2006/0078705 | A1 | 4/2006 | Glatkowski et al. |
| 2010/0203789 | A1 | 8/2010 | Takebayashi et al. |
| 2011/0017867 | A1 | 1/2011 | Simmons et al. |
| 2013/0048331 | A1 | 2/2013 | Fornes et al. |
| 2014/0011414 | A1 | 1/2014 | Kruckenberg et al. |
| 2014/0080378 | A1 | 3/2014 | Wasynczuk |
| 2014/0151111 | A1 | 6/2014 | Shah et al. |
| 2017/0204519 | A1 | 7/2017 | Kwag et al. |
| 2017/0291332 | A1 | 10/2017 | Braley et al. |

FOREIGN PATENT DOCUMENTS

| | | |
|---|---|---|
| EP | 0 629 549 | 12/1994 |
| EP | 2285562 B1 | 8/2016 |
| EP | 3178966 A1 | 6/2017 |
| EP | 3235632 A1 | 10/2017 |
| JP | H11-220283 A | 8/1999 |
| JP | 2005-059580 A | 3/2005 |
| JP | 2008-255415 A | 10/2008 |
| JP | 2011-519749 A | 7/2011 |
| JP | 2017-526816 A | 9/2017 |
| WO | 1997023343 | 7/1997 |
| WO | 2002076430 | 10/2002 |
| WO | 2010120426 | 10/2010 |
| WO | 2016010287 A1 | 1/2016 |
| WO | 2019018754 A1 | 1/2019 |
| WO | 2021087168 A1 | 5/2021 |

OTHER PUBLICATIONS

[NPL-2] "Electrical Conductivity", Technical Fibre Products, Inc.; Jul. 7, 2023; <https://www.tfpglobal.com/products/composite-materials/electrical-conductivity>. (Year: 2023).*

[NPL-3] TFP Ltd., "Electrical Conductivity & Resistivity", brochure obtained at the Technical Fibre Products Inc. booth during the Composites and Advanced Materials EXPO (CAMX), Anaheim, CA on Aug. 26, 2019. (Year: 2019).*

International Search Report and Written Opinion dated Dec. 17, 2018 for related International Application No. PCT/US2018/043069, filed Jul. 20, 2018 (13 pages).

TFP Ltd., "Optimat® Technical Data Sheet—20404E Nickel Coated Carbon Mat", Technical Fibre Products Inc., Jan. 2015 (2 pages).

TFP Ltd., "Optimat® Technical Data Sheet—20444A Copper & Nickel Coated Carbon Mat", Technical Fibre Products Inc., Jan. 2015 (2 pages).

TFP Ltd., "Electrical Conductivity & Resistivity", brochure obtained at the Technical Fibre Products Inc. booth during the Composites and Advanced Materials EXPO (CAMX), Anaheim, CA on Aug. 26, 2019 (1 page).

TFP Ltd., "Metal Coated Veils and Mats", Oct. 21, 2016, Technical Fibre Products Inc., obtained from the Wayback Machine, http://web.archive.org/web/20161021025831/http://www.tfpglobal.com:80/materials/metal-coated (2 pages).

Di Bari, George A., " Chapter 3—Electrodeposition of Nickel", Modern Electroplating, $5^{th}$ ed., 2010, pp. 79-114 (36 pages).

SAE Aerospace, "ARP5414 Rev. A—Aircraft Lightning Zone", Aerospace Recommended Practice, SAE International, 2012 (33 pages).

Abys, Joseph A., "Chapter 12—Palladium Electroplating", Modern Electroplating, 5th ed., 2010, 327-368 (42 pages).

Krulik, G.A., *Tin-Palladium Catalysts for Electroless Plating*, 26 Platinum Metals Review 58-64, 1982 (7 pages).

International Search Report and Written Opinion dated Feb. 25, 2021 for related International Application No. PCT/US2020/058051, filed Oct. 29, 2020 (9 pages).

U.S. Appl. No. 16/632,736, filed Jul. 20, 2018, General Nano LLC.
U.S. Appl. No. 17/084,537, filed Oct. 29, 2020, General Nano LLC.

* cited by examiner

LIGHT-WEIGHT, HIGHLY-CONDUCTIVE REPAIR MATERIAL

CROSS-REFERENCE TO RELATED APPLICATION

The present application claims the benefit of U.S. Provisional Application Ser. No. 62/966,772 filed Jan. 28, 2020, the disclosure of which is hereby incorporated by reference in its entirety.

TECHNICAL FIELD

The present disclosure is related to composite materials and, more particularly, to a light-weight, highly-conductive material useful in the repair of a lightning strike protection layer.

BACKGROUND

Aerospace vehicles, including, but not limited to aircraft, such as general aviation aircraft and large commercial jets, guided missiles, space vehicles, aircraft engines, and propulsions units, are susceptible to damage resulting from lightning strikes. Typically, current from a lightning strike seeks the most conductive or metal paths available. However, several of the components within the aerospace vehicle, including portions of the surface, are formed from composite materials. Unlike components formed from metallic materials, many of the components formed from composites cannot readily conduct away the extreme electrical currents and electromagnetic forces generated by lightning strikes because some composite materials, such as carbon fiber, are either significantly less conductive than metals, while others, such as fiberglass, are not conductive at all. As a result, lightning-strike protection has been a significant concern for aerospace vehicles ever since the first composite materials were used in their construction more than thirty years ago.

For example, when lightning strikes an unprotected composite material, the 200,000 amps, or more, of electric current that is generated from the strike will attempt to seek the path of least resistance. This can result in the vaporization of metal control cables, the welding of hinges on control surfaces, and even the explosion of vapors within fuel tanks if the current can arc across gaps that can be found around fasteners. Additionally, resin materials in the immediate strike area can be vaporized, with possible burn-through of the laminate. Other indirect effects from the lightning strike can also occur when magnetic fields and electrical potential differences in the structure induce transient voltages, which can damage and even destroy avionics or onboard electronics that have not been shielded from electromagnetic fields or lightning-strike protected.

To combat these issues, specialized materials that provide lightning-strike protection and that are compatible with aircraft components formed from composite materials have been developed. Typically, lightning-strike protection can be provided and/or enhanced by: creating adequate conductive paths so that the current remains on a structure's exterior; eliminating gaps in the conductive path to prevent arcing at attachment points and igniting fuel vapors; and sheltering wiring, cables, and sensitive equipment from damaging surges or transients. Such strategies can partially be accomplished through grounding, electromagnetic field shielding, and the use of surge suppression devices where necessary.

However, for external surface protection in particular, several metal and metallized-fiber products have been developed. Non-limiting examples include, but are not limited to, woven metal fiber screens, non-woven metal or metallized-fiber screens, and expanded foils that are formed from metal and can be perforated and stretched or expanded, i.e., expanded metal foils. For example, European Patent No. 2,285,562, describes a system and method for fabrication of an integrated lightning strike protection system including an expanded metal foil, the disclosure of which is incorporated by reference it its entirety. These mesh-like products enable the lightning current to travel across the structure's surface, reducing its focus, and protecting the aircraft. Aluminum wire, interwoven with carbon fiber, was one of the first lightning strike protection materials. However, using aluminum with carbon fiber risks galvanic interaction and can be susceptible to corrosion. Interwoven copper wires can prevent galvanic interaction and/or corrosion but are about three times as heavy as aluminum. Alternatively, rather than using wire, one or more metals, including but not limited to nickel, iron, and/or copper, can be electrodeposited onto carbon and other fibers, to provide both electromagnetic field (EMF) shielding and lightning-strike protection. Still, expanded metals foil are the most commonly used form of external surface protection.

While there are several manufacturers that offer lightning-strike protective products and systems, including Astroseal Products, Dexmet, Alcore, Engineered Cramer Composites, Adhesive Prepregs for Composite Manufacturers (APCM), Henkel AG & Company, Cytec Engineered Materials, and Hexcel, there are two manufacturers that are notable for their recent production of metallized fibers and fabrics, Technical Fibre Products (TFP) and Hollingworth & Vose (H&V). For example, TFP offers electrically conductive non-woven mats and veils, formed by binding chopped, metal-coated carbon fibers together. Examples of metal coating types that are offered include, but are not limited to, nickel, copper, precious metals, and alloys such as nickel/iron, copper/tin, and copper/zinc alloys, which can be applied in single-, double-, and tri-layered options. H&V offers similarly constructed nickel-coated carbon fiber non-woven materials which have been shown to provide Zone 1A lightning-strike protection during testing. Both TFP and H&V products have a metal-coating deposition weight in a range from 10% and up to 65% by weight of the finished product, and are flexible, lightweight, and easier to handle and repair relative to metallic meshes and expanded metal foils, which typically require an isolation layer to prevent galvanic corrosion. However, while such metallized non-woven products can be manufactured to be lightweight relative to metallic meshes and expanded metal foils, they can still be heavier than optimum at low resistivities and can be difficult to pre-impregnate with a resin system. Again, an expanded metal foil is still one of the most commonly used forms of lightning strike protection.

Yet when, for example, lightning strikes an aircraft having a carbon fiber composite structure including an expanded metal foil as part of a lightning strike protect system, damage to the aircraft and, more particularly, the expanded metal foil can and does occur. Several methods, apparatuses, and repair systems relative to this type of damage have been described in U.S. Pat. Nos. 6,758,924, 8,231,751, and 8,246,770, U.S. Patent Application Publication US2006/0078705, and PCT Publications WO199723343 and WO2002076430, the disclosures of which are incorporated by reference in their entireties.

Despite all of the methods, apparatuses, and repair systems, there is still a need for those skilled in the art to continue with research and development efforts in the field of composite materials and the repair of lightning strike protections systems, and particularly to devise materials that are light-weight and highly-conductive while providing comprehensive lightning-strike protection in aerospace vehicles.

SUMMARY OF THE INVENTION

The present invention provides a light-weight, highly-conductive material useful for repairing a lightning protection system in an aircraft. The material comprises a nonwoven carbon fiber veil, the veil including a plurality of carbon fibers looped randomly throughout the veil and a binder material that binds the plurality of fibers together forming the veil, and a metal coating covering at least a portion of a surface of the plurality of bound fibers of the veil, and preferably the entire surface of both the plurality of bound fibers and the binder material, wherein the metal coating forms a highly-conductive network that follows the shape of the plurality of fibers in the veil, wherein the areal weight of the broad good is in a range from at least 5 grams per square meter (gsm), up to 12 gsm, and wherein the sheet resistance of the broad good is in a range from at least 0.5 ohms per square ($\Omega/\square$), up to $2\Omega/\square$.

According to the present invention, and useful in combination with any one or more of the above aspects and embodiments, the material is manufactured as a broad good and supplied as a sheet or a patch.

According to the present invention, and useful in combination with any one or more of the above aspects and embodiments, the sheet or the patch having a length and a width, the ratio between the length and width in a range from 0.5:1, up to 2:1, and preferably approximately 1:1.

According to the present invention, and useful in combination with any one or more of the above aspects and embodiments, the material is manufactured and supplied as a broad good.

According to the present invention, and useful in combination with any one or more of the above aspects and embodiments, the broad good having a width and a length, the ratio of the length to the width defining an aspect ratio, the aspect ratio in a range from at least 10:1, up to 10,000:1 or more, and preferably in a range from at least 100:1 up to 1,000:1.

According to the present invention, and useful in combination with any one or more of the above aspects and embodiments, the width of the broad good in a range from at least 12 inches (30.48 centimeters), up to 72 inches (182.88 centimeters), and preferably in a range from at least 36 inches (91.44 centimeters) up to 36.5 inches (92.71 centimeters).

According to the present invention, and useful in combination with any one or more of the above aspects and embodiments, the areal weight of the nonwoven carbon fiber veil is approximately 7 gsm.

According to the present invention, and useful in combination with any one or more of the above aspects and embodiments, each fiber has a diameter of at least about 1 micron, and up to at least about 10 microns, wherein each fiber has a length of at least 1 millimeter (mm), and up to at least 10 mm, and wherein each fiber has an aspect ratio of about 10,000:1, down to about 1,000:1.

According to the present invention, and useful in combination with any one or more of the above aspects and embodiments, the binder material comprises a polymeric binder.

According to the present invention, and useful in combination with any one or more of the above aspects and embodiments, the binder material is a polystyrene-acrylic binder.

According to the present invention, and useful in combination with any one or more of the above aspects and embodiments, the areal weight of the binder material within the material is at least 0.25 grams per square meter (gsm), up to 1.20 gsm, and preferably at least 0.35 gsm up to 0.70 gsm.

According to the present invention, and useful in combination with any one or more of the above aspects and embodiments, the metal coating is applied to the at least a portion of a surface of the plurality of bound fibers of the veil, and preferably the entire surface of both the plurality of bound fibers and the binder material through an electroless plating (EL) process.

According to the present invention, and useful in combination with any one or more of the above aspects and embodiments, the metal coating comprises nickel.

According to the present invention, and useful in combination with any one or more of the above aspects and embodiments, the areal weight of the metal coating is at least 3 grams per square meter (gsm), up to 5 gsm, and preferably about 5 gsm.

According to the present invention, and useful in combination with any one or more of the above aspects and embodiments, the metal coating comprises at least 30% by weight up to 42% by weight, preferably a range from at least 30% by weight and up to 42% by weight, and more preferably 42% by weight, of the total mass of the material.

According to the present invention, and useful in combination with any one or more of the above aspects and embodiments, the highly-conductive network provides a shielding effect of at least about 40 decibels (dB), at least about 50 dB, at least about 60 dB, at least about 70 dB, up to about 80 dB, from 1-8.5 gigahertz (GHz).

According to the present invention, and useful in combination with any one or more of the above aspects and embodiments, when applied to a surface of an aircraft and electrically coupled to a lightning strike protection system located therein, the material provides at least one of electrical continuity between a lightning-strike protection layer and a patch made to the lightning-strike protection layer, protection from a high intensity radiated field (HIRF), and protection from a lightning strike to or proximate the aircraft.

According to the present invention, and useful in combination with any one or more of the above aspects and embodiments, when applied to a surface of an aircraft, the material provides Zone 1A lightning-strike protection for the aircraft.

The present invention also provides methods of repairing an aircraft using the light-weight, highly-conductive material. According to the present invention, the methods of repairing a lightning protection system in an aircraft that has sustained damage, the system comprising a carbon fiber composite structure including an expanded copper foil (ECF), the methods including the steps of removing at least one of paint, primer, resin and composite surrounding the damage to expose a portion of the ECF; cutting an ECF patch to fit the damaged area; inserting the ECF patch into the damaged area; placing a piece of a light-weight, highly-conductive material over the ECF patch and the exposed portion of the ECF surrounding the damage, the material forming a low impedance electrical connection between the ECF patch and the exposed portion of the ECF; and repairing any composite that was removed to expose the portion of the ECF.

According to the present invention, and useful in combination with any one or more of the above aspects and embodiments, the damage caused by a lightning strike.

According to the present invention, and useful in combination with any one or more of the above aspects and embodiments, wherein the step of removing the at least one of paint, primer, resin and composite is performed by sanding.

According to the present invention, and useful in combination with any one or more of the above aspects and embodiments, wherein the ECF patch is of the same type as the ECF included in the carbon fiber composite structure.

According to the present invention, and useful in combination with any one or more of the above aspects and embodiments, further comprising the step of applying a filler to smooth the surface of the repaired carbon fiber composite structure.

According to the present invention, and useful in combination with any one or more of the above aspects and embodiments, further comprising the step of priming and painting the outer surface of the aircraft to complete the repair.

DETAILED DESCRIPTION

The present invention provides light-weight, highly-conductive materials that are useful in the repair of lightning protection systems in aircraft or other aerospace vehicles, inter alia. The materials of the present invention can be produced or manufactured in the form of a broad good and supplied in the that same form, i.e., in the form of a broad good, or alternatively, and in several embodiments, supplied in the form of a sheet or a patch, the sheet or the patch cut from the broad good. Thus, the balance of the following description refers to broad goods, but those skilled in the art will understand that that it applies equally well to the light-weight, highly-conductive materials mentioned hereinabove, the terms "material" and "broad good" being interchangeable or somewhat synonymous as used herein, the distinction being that the sheet or the patch is a "material," but not a "broad good," although they are cut from a "broad good."

The materials or broad goods of the present invention can comprise a nonwoven carbon fiber veil to which a metal coating is applied. The veil includes a plurality of randomly looped carbon fibers that are bound together by a binder material forming the veil. The metal coating, which when applied to at least a portion the surface of the fibers and/or the binder material can form a highly-conductive network that follows the shape of the fibers in the veil. The resulting metallized veil can be used in the repair of damage to a lightning-strike protection layer, e.g., an expanded copper foil (ECF) or a conductive broad good, in an aircraft or other aerospace vehicle thereby restoring and/or providing protection from a future lightning strike to or proximate the aircraft or aerospace vehicle, and/or shielding from a high intensity radiated field (HIRF) directed towards the same.

In an embodiment, the material can be supplied or provided as a sheet or a patch, cut from a broad good roll, and can have both a length and a width. In an embodiment, a sheet or a patch can have dimensions such that the ratio between the length and width can be in a range from 0.5:1, up to 2:1. In another embodiment, a sheet or a patch can have dimensions such that the ratio between the length and width is approximately 1:1.

Figure 1:
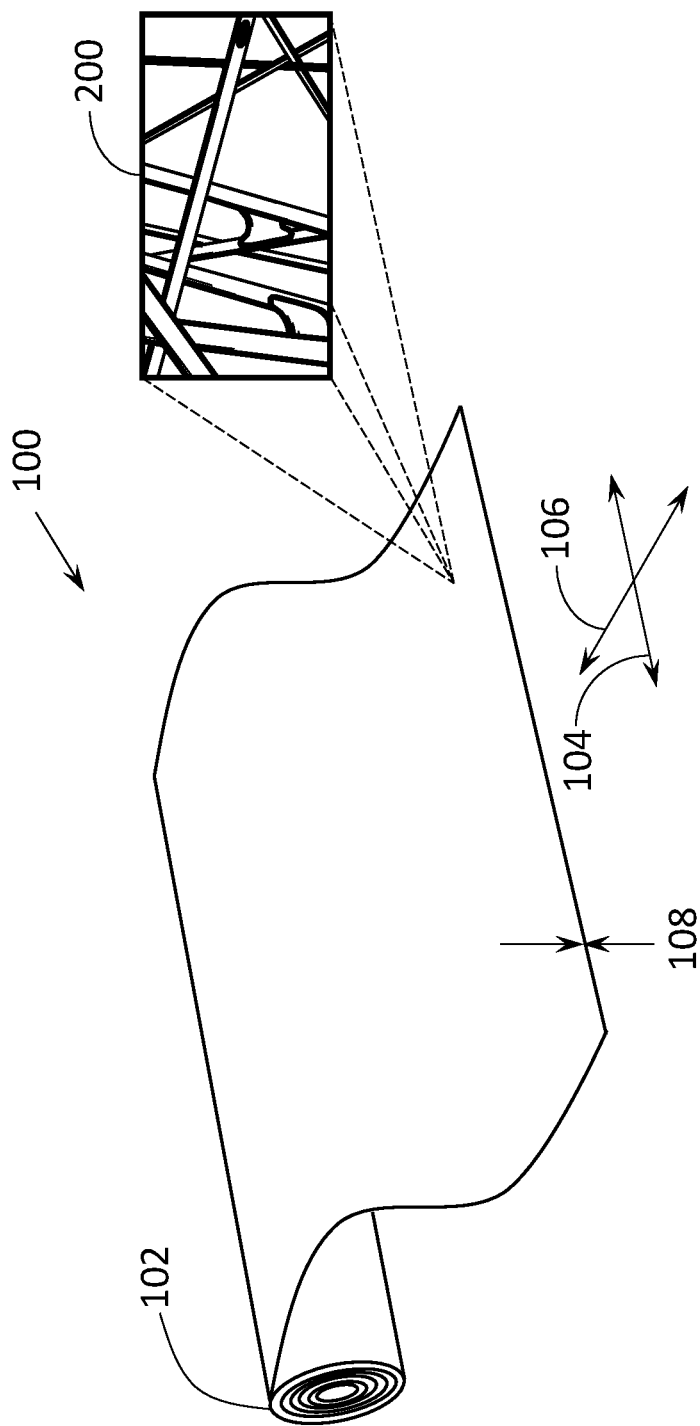
FIG. 1 is a perspective view of a light-weight, highly-conductive broad good according to present invention.

In another embodiment, and as illustrated in the perspective view in FIG. 1, a material can be manufactured as broad good 100 and supplied in a roll 102, as is common in the composite material industry. As with a sheet or patch, the broad good 100 supplied in a roll 102 can also have a length 106 and a width 104, although the width 104 of broad good 100 can be much less than the length 106. In another embodiment, the ratio of the length 106 to the width 104 defines an aspect ratio. The ratio between the length 106 and the width 104 of the broad good 100 or the aspect ratio can be in a range from at least 10:1, up to 10,000:1 or more. In another embodiment, the ratio between the length 106 and the width 104 of the broad good 100 or the aspect ratio can be in a range from at least 100:1, up to 1,000:1.

In another embodiment, the length 106 and width 104 of a broad good 100 can be expressed in terms of yards and inches (or meters and centimeters), respectively. As used herein and described in further detail below, where a dimension is described in terms of yards or inches, the description also inherently describes the dimension in terms of its metric counterpart, unless otherwise noted. For example, if a particular width is defined to be 12 inches, the same description also inherently includes the metric width, about 30.5 cm. Similarly, a value described by a metric quantity, for example 1 meter, also inherently describes the value in terms of yards (1.09 yd). Those skilled in the art would understand than most units of measure, including distance, can be readily be converted between imperial and metric systems, and that duplicate recitations of imperial and metric measurements are omitted for clarity.

In another embodiment, the width 104 alone can be utilized to define the broad good 100. As used hereinafter, a broad good refers to standard and/or wider widths, especially in distinction from ribbons, bands, tows, or trimmings. In another embodiment, the broad good 100 can have a width 104 of at least about 12 inches, including at least about 18, 24, 30, 36, 42, 48, or 60 inches, up to at least about 72 inches. In another embodiment, the broad good 110 can have a width 104 of less than about 72 inches, including less than about 60, 48, 42, 36, 30, 24, 18, down to about 12 inches. In another embodiment, the broad good 100 can have a width 104 in a range from about 12 inches up to about 18 inches, or 24 inches, or 30 inches, or 36 inches, or 42 inches, or 48 inches, or 60 inches, or 72 inches. In another embodiment, the broad good 100 can have a width 104 in a range between and inclusive of any two widths described above.

In non-limiting examples, a purchaser of a broad good 100 can select from standard widths commonly offered in the industry, particularly from 12 inches up to 72 inches, based on the material coverage coverage needed for an application. In another embodiment, a broad good 100 can include, but is not limited to 12 inches, 24 inches, 30 inches, 36 inches, 48 inches, 60 inches, or 72 inches. In yet another embodiment, a broad good 100 can range from at least 36 inches up to 36.5 inches in accordance with a specification associated with an original equipment manufacturer (OEM), for example. However, and in another embodiment, those skilled in the art will appreciate that the broad goods or materials of the present invention are not limited to a specific length or width, and that any desired length 106 or width 104 can be selected without departing from the spirit of the present invention.

In another embodiment, the broad good 100 can also have a thickness 108 that is small relative to the width 104, and particularly the length 106, of the broad good. In another embodiment, the thickness 108 of the broad good 100 can be at least about 1 mil (0.001 in), including at least 2, 3, 4, 5, 6, 7, 8, 9, 10, 15, 20, 25, or 30, up to about 40 mil. In another embodiment, the thickness 108 of the broad good 100 can be at least about 25 microns, including at least 50, 75, 100, 125, 150, 175, 200, 250, 300, 400, 500, or 750, up to about 1,000 microns. In another embodiment, the thickness 108 of the broad good 100 can be in a range from about 1 mil up to about 2 mil, or 3 mil, or 4 mil, or 5 mil, or 6 mil, or 7 mil, or 8 mil, or 9 mil, or 10 mil, or 15 mil, or 20 mil, or 30 mil, or 40 mil, and preferably in a range from about 2 mil up to about 3 mil, or 4 mil, or 5 mil, or 6 mil, or 7 mil, or 8 mil, or 9 mil, or 10 mil. In another embodiment, the thickness 108 of the broad good 100 can be in a range from about 25 microns up to about 50 microns, or 75 microns, or 100 microns, or 125 microns, or 150 microns, or 175 microns, or 200 microns, or 250 microns, or 300 microns, or 400 microns, or 500 microns, or 750 microns, or 1,000 microns, and preferably in a range from about 50 microns up to about 75 microns, or 100 microns, or 125 microns, or 150 microns, or 175 microns, or 200 microns, or 250 microns, or 300 microns. In another embodiment, the thickness 108 of the broad good 100 can be in a range between and inclusive of any two thicknesses above. However, those skilled in the art will appreciate that the thicknesses 108 can be varied as desired without departing from the spirit of the present invention.

Figure 2:
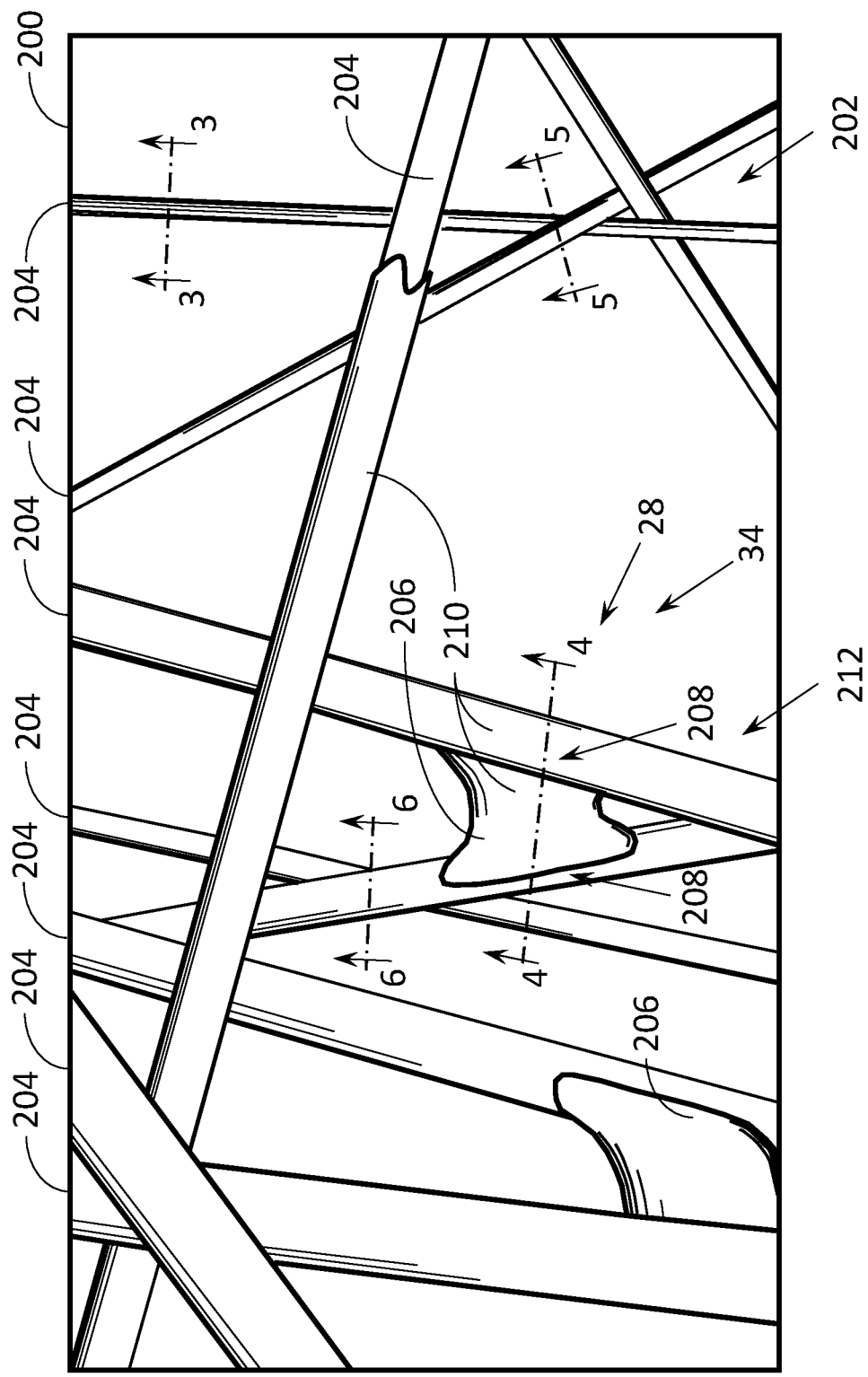
FIG. 2 is a detailed perspective view of the light-weight, highly-conductive broad good shown in FIG. 1.

Referring now also to FIG. 2, a detailed perspective view 200 of a nonwoven carbon fiber veil 202 to which a metal coating 210 has been applied is shown. In an embodiment, the nonwoven carbon fiber veil 202 comprises a plurality of carbon fibers 204 and a binder material 206 that binds the plurality of carbon fibers together forming the veil. In an embodiment, and as illustrated in FIG. 2, the plurality of carbon fibers 204 can be looped randomly throughout the veil 202 and/or the broad good 100. However, and in another embodiment, the plurality of carbon fibers 204 can be dispersed evenly throughout the veil 202 and/or the broad good 100. In another embodiment, the plurality of carbon fibers 204 can be randomly or evenly dispersed, entangled, looped, interweaved, and/or entwined. However, although a sample of the plurality of carbon fibers 204 can appear straight when viewed in close-up conditions, such as when viewed in a scanning electron microscope and is depicted in the perspective view of FIG. 2, those skilled in the art would nonetheless appreciate that each of the carbon fibers 204 can take any shape in the veil 202 and/or broad good 100 as a whole. As further illustrated in FIG. 2, each carbon fiber 204 has a small diameter compared to its length. In another embodiment, each carbon fiber 204 can have a diameter of at least about 1 micron, and up to at least about 10 microns, while each fiber can have a length of at least 1 mm, and up to at least 10 mm. As a result, and in another embodiment, each fiber can have an aspect ratio, i.e., the ratio of the length of the fiber to the width of the fiber, of about 10,000:1 (or greater), down to about 1,000:1.

A binder material 206 can be used to hold or bind each of the plurality of fibers 204 together at a plurality of proximal points 208, thereby forming the veil 202. In one embodiment, the veil 202 or veil mat comprises the plurality of fibers 204 and the binder material 206. In an embodiment, the binder material 206 comprises a polymeric binder. Further, in an embodiment, the binder material 206 is configured to resist chemical attack which could cause the plurality of bound fibers 204 to come apart, and/or cause the general shape of the veil 202 to be significantly distorted during handling or the application of the metal coating 210 as will be described hereinafter. In an embodiment, the binder material 206 can selected from the group consisting of, though is not limited to, acrylonitrile butadiene styrene (ABS), acetal, acrylic, cellulose acetate butyrate (CAB), chlorinated polyvinyl chloride (CPVC), ethylene chlorotrifluoroethylene (ECTFE), Fluorosint, polyamide (nylon), polyether ether ketone (PEEK), polyethylene terephthalate (PET), polycarbonate, polypropylene, polysulfone, polyphenylene (PPS), polyvinyl chloride (PVC), polyvinyl alcohol (PVA), polyvinylidene fluoride or polyvinylidene difluoride (PVDF), polytetrafluoroethylene (PTFE), Tecator, styrene acrylic, phenoxy, polyurethane, polyimide, fluorinated ethylene propylene (FEP), cross-linked polyester, styrene acrylic, co-polyester, and ultrahigh molecular weight polyethylene (UHMPE or UHMW), and combinations thereof. In another embodiment, the binder material 206 is a polystyrene-acrylic binder.

In an embodiment, the veil 202 comprising the plurality of carbon fibers 204 and the binder material 206 can be purchased in the form of a surfacing carrier, a surfacing veil, or nonwoven carbon fiber veil. Suppliers of these carriers or veils include Technical Fibre Products, headquartered in Burneside, England, and Hollingsworth & Vose, headquartered in Massachusetts. Such carriers or veils are typically specified in an areal weight, a basis weight, or a weight per unit area, e.g., grams per square meter ($g/m^2$ or gsm). Nonwoven carbon fiber veils are typically available with areal or basis weights between at least about 2 gsm, up to about 50 gsm, or as much as 70 gsm. These nonwoven carbon fiber veils are not intended to carry structural loads, like heavier fabrics used in conventional load-bearing composite structures with areal weights typically greater than at least about 70 gsm. Rather, these nonwoven carbon fiber veils generally have good resin up-take and are used for surface finishing or providing a smooth outer surface for a composite structure with minimal processing and fiber pattern bleed through, and are not intended for carrying weight or structural loads, or weight-bearing, and are non-weight bearing. A smooth outer surface is particularly import in airfoils, such as airplane wings, or aircraft engine nacelle or cowls, for example. Further, minimizing fiber pattern bleed through reduces the amount of paint required to provide a clean esthetic appearance, thereby reducing capacitance as will be understood by those skilled in the art.

In an embodiment and as taught herein, the present invention provides "metalizing" or coating a nonwoven carbon fiber veil 202 with a metal in a "continuous," i.e., over the plurality of carbon fibers 204 and the binder material 206, or a highly-conductive manner that allows the broad good or material to be used in the repair of a lightning-strike protection system in an aircraft, for example.

In one embodiment, a nonwoven carbon fiber veil 202 with a basis weight of at least 5 gsm, up to 12 gsm, can be selected. In a nonwoven carbon fiber veil 202 with a basis weight of 5 gsm, up to 12 gsm, the binder material 206 can comprise about 5 to 10% of the total weight, meaning approximately 0.25 gsm, up to 1.20 gsm, leaving approximately 4.50 gsm, up to 11.40 gsm for the fibers. In another embodiment and as shown in FIG. 2, a nonwoven carbon fiber veil 202 with a basis weight of approximately 7 gsm can be selected. In a nonwoven carbon fiber veil 202 with a basis weight of approximately 7 gsm, the binder material 206 can also comprise about 5 to 10% of the total weight, meaning approximately 0.35 gsm, up to 0.70 gsm, leaving approximately 6.30 gsm, up to 6.65 gsm for the carbon fibers.

As will be appreciated by those of skill in the art, lightning strikes to airplanes can affect structure at entrance and exit points. Lightning damage usually shows as pits, burn marks, and irregular or circular holes, etc. Holes can be grouped in one location or divided around a larger area. Burned or discolored skin can be a visible indication of lightning strike damage. Further, when lightning strikes an aircraft, the sheer magnitude, quantity, amount, and/or duration of the current contained in the strike can result in damage to a lightning-strike protection layer, e.g., an expanded copper foil (ECF) or a conductive broad good, contained in an aircraft or incorporated into an aircraft structure. For example, in composite structures, the resin is often reflowed and/or damaged, and many times with stronger strikes, particularly in certain specially designated areas or zones of the aircraft, e.g., Zone 1A, even vaporized. Further, damage can result to the lightning strike protection layer or the ECF or the conductive broad good itself, causing a breach in the lightning-strike protection layer and/or a hole in the ECF or the conductive broad good. Were an aircraft to continue to fly in this manner, after having been struck, and without repair, a subsequent strike could be catastrophic. However, by appropriately using the material of the present invention and an associated method of repair, as described hereinafter, sufficient electrical continuity across a breach, e.g., a hole, in a lightning-strike protection layer can be restored, and protection from a subsequent lightning strike and/or a high intensity radiated field (HIRF) provided. Further and in an embodiment, by using the light-weight, highly-conductive material of the present invention, the amount of surfacing material or resin required for the repair is reduced and/or minimized, thereby reducing capacitance and preventing the potential for burn-through, delamination, etc., in the future. In an embodiment, the use of a material in accordance with the present invention reduces the amount of time and cost required to repair a damaged aircraft.

Figure 7:
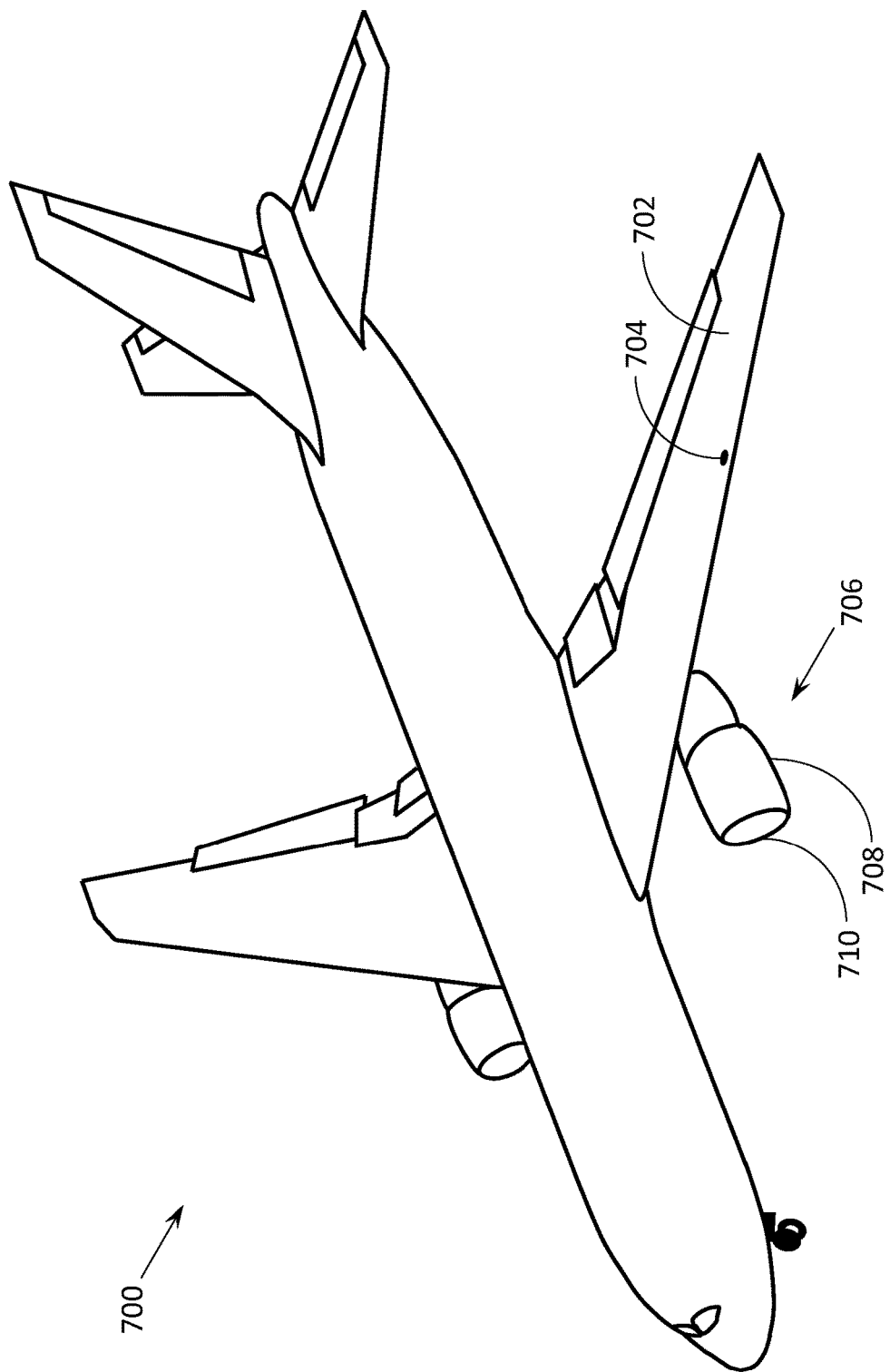
FIG. 7 is a perspective view of an airplane, a portion of which has sustained lightning strike damage.

Referring to FIG. 7 and in a non-limiting example, an airplane 700 having a carbon fiber composite wing structure 702 including an ECF as part of a lightning strike protect system is shown. Further, and as also depicted, the airplane 700 has been struck by lightning and sustain damage as indicated at reference numeral 704. Those of skill in the art will appreciate that the damage has been sustained along the leading edge of the wing in what is commonly designated Zone 1A, in a substantially planar portion thereof, for purposes of ease in illustration and as will be shown in more detail hereinafter. However, the location of the damage in no way limits the applicability of the present invention. For example, the present invention can also be useful in the repair of an ECF in a nacelle 706 or along a leading edge 710 of a jet engine cowl 708, also typically designated as Zone 1A, although the curvature or shape of the parts in these areas would have made illustration more difficult. Thus, those skilled in the art will appreciate that damage, from lightning or otherwise, can be sustained to a lightning strike protection system in other structures comprising the airplane and/or in other areas or zones, i.e., Zones 1B, 1C, 2A, 2B, and C, and that the present invention applies equally in those areas or Zones.

Figure 8:
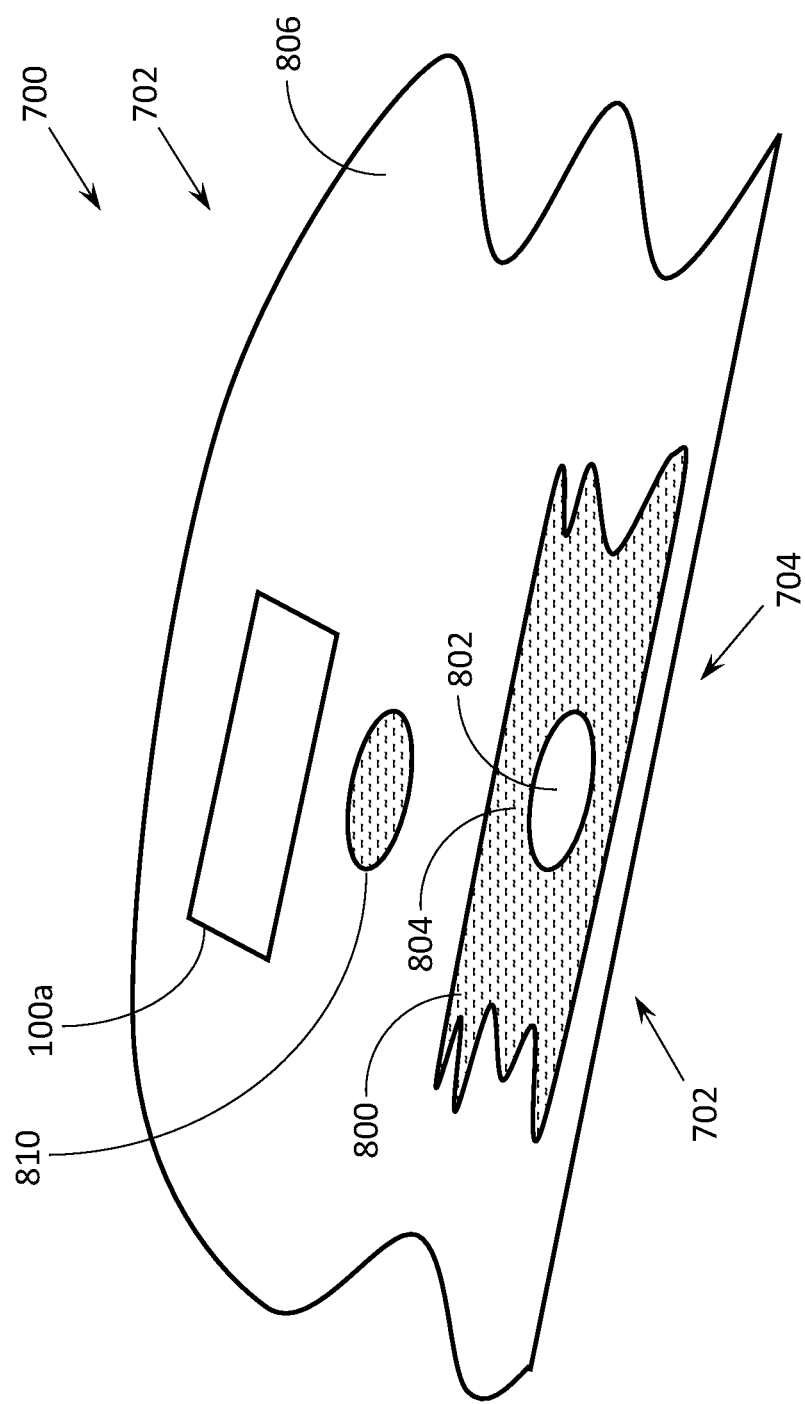
FIG. 8 is a partial exploded view of a repair to a carbon fiber composite structure shown in FIG. 7.
Figure 9:
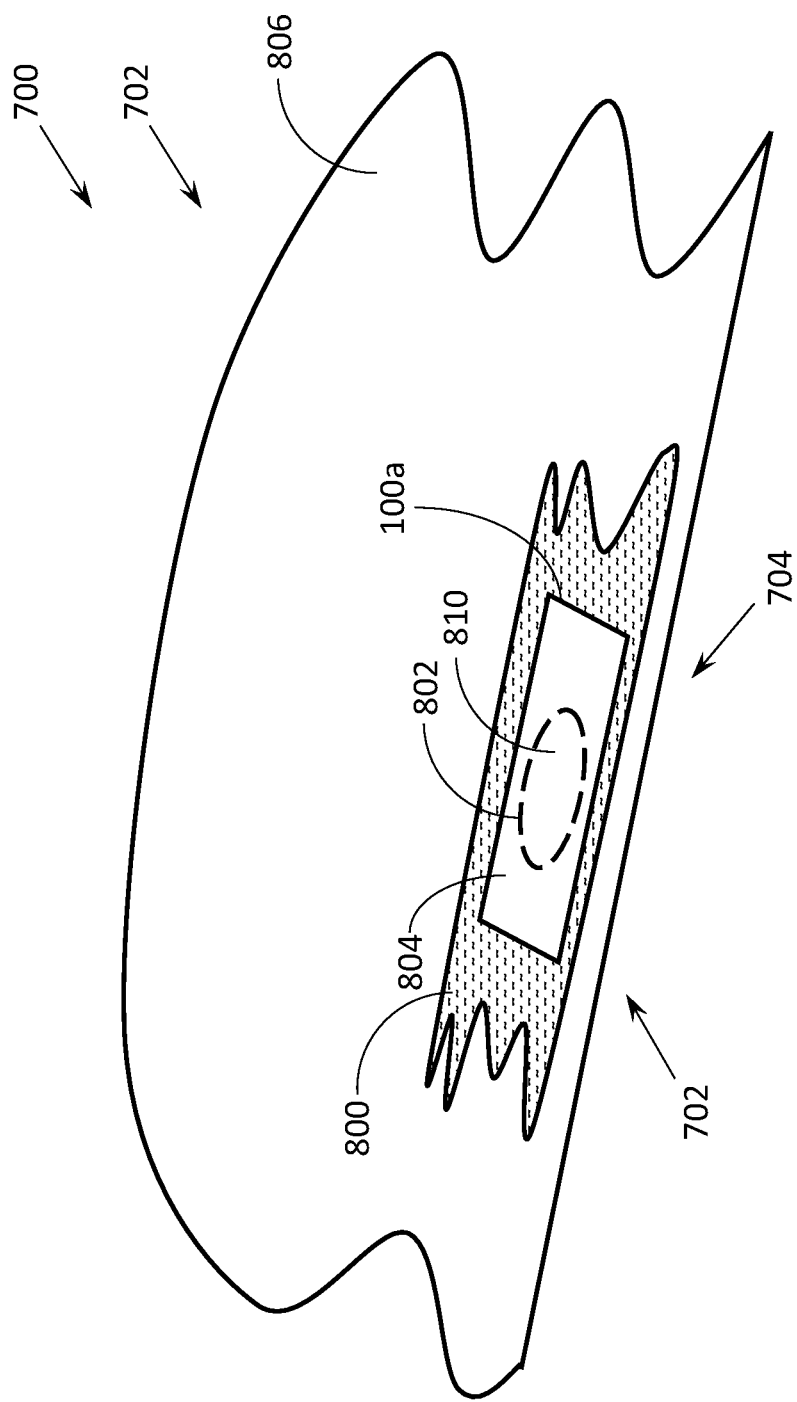
FIG. 9 is a partial exploded view of a partially completed repair to the carbon fiber composite structure shown in FIG. 8.
Figure 10:
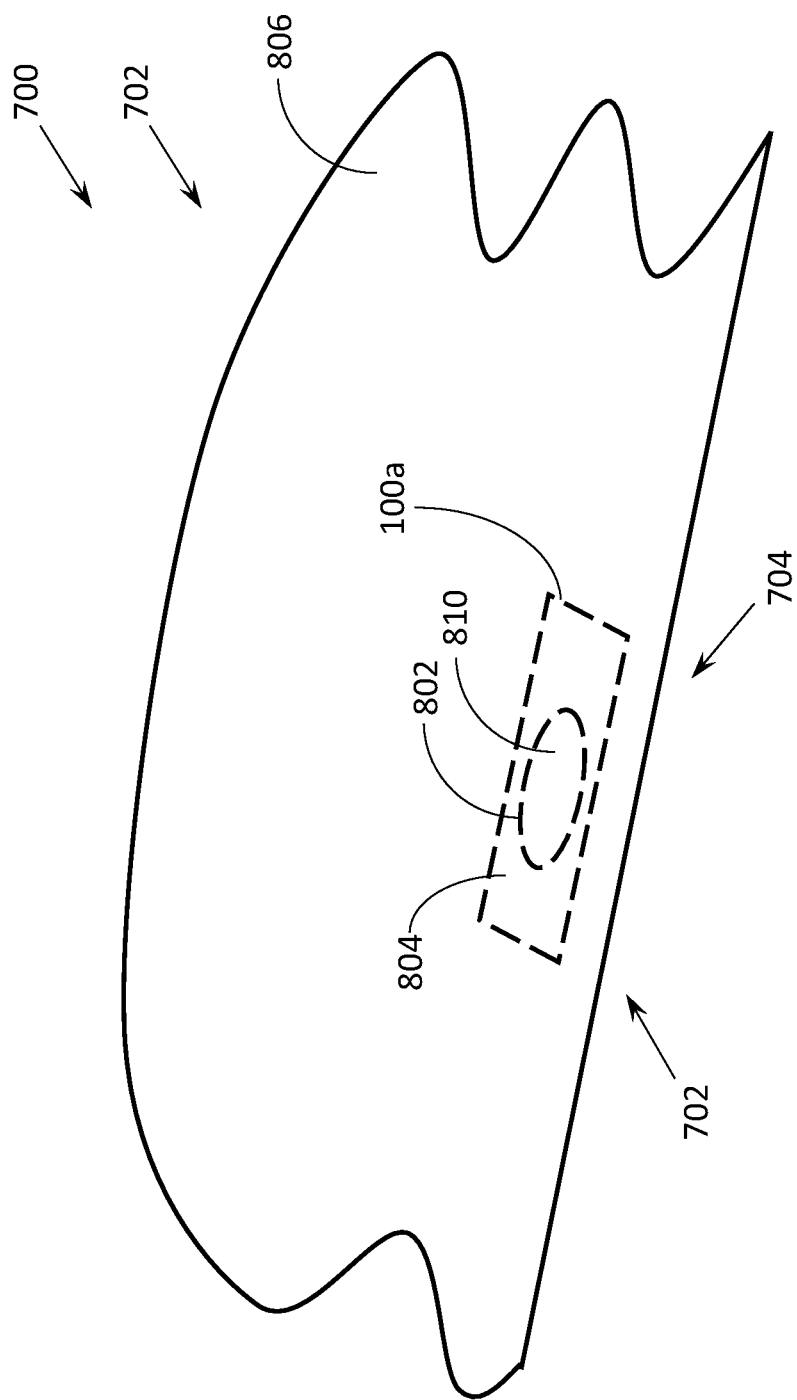
FIG. 10 is a view of a completed repair.

Referring to FIG. 8 and as will be more easily seen, the damage 704 is in the form of a hole 802 that the lightning strike burned in the ECF 800 when attaching to the airplane 700. Alternatively, and in another embodiment, rather than an ECF, a lightning strike protection system can comprise a conductive broad as described in PCT Publication WO2019018754, the disclosure of which is incorporated by reference in its entirety. Those of skill in the art will appreciate that lightning-strike damage is typically not perfectly, symmetrical shaped like a circle or ellipse, as depicted in FIGS. 8-10, but rather, jagged or irregularly shaped around its periphery or edge, and generally shaped like a hole, a circular or elliptical shape being used herein for purposes of ease in illustration. The present invention is not bound to any particular shape. As also shown, and in a method of repair, a portion of the paint, primer, resin and/or composite 806 surrounding the hole 802 has been removed, i.e., sanded away, exposing a portion 804 of the ECF 800 surrounding the damage 704 or hole 802. Continuing with the method of repair, a patch of ECF 810 has been fashioned or cut to fit the hole 802. Typically, and in an embodiment, the patch of ECF 810 is the same type of foil as the ECF 800 used in the carbon fiber composite wing structure 702 however, that need not necessarily be the case in every embodiment. In an embodiment, the patch 810 is cut in approximately the same size and shape as the hole 802, and fits into the hole 802 without substantially overlapping onto the portion 804 of the ECF 800 surrounding the hole 802. Those skilled in the art will appreciate that without the benefit of the present invention, this arrangement or manner of repairing or patching an ECF 800 in a lightning strike protection layer of carbon fiber composite wing structure 702 would not result in sufficient electrical conductivity between the patch 810 and the ECF 800 to provide protection. Rather, and in stark contrast to the present invention, the patch would have to be much larger than the hole, overlapping substantially onto the ECF surrounding the hole in order to provide sufficient electrical connectivity and conductivity. Unfortunately, overlapping a patch in such a substantial amount requires the use of additional filler, e.g., resin, to blend the overlapped patch into the structure, and this additional filler material increases the distance between the ECF layer and the outer surface in the filled areas, thereby increasing the capacitance and making the lighting strike protection less effective.

Thus, referring also to FIG. 9, once the ECF patch 810 (shown in dashed line) has been cut and fit into the hole 802, the method continues with placing a piece of a light-weight, highly-conductive material 100a over the patch. In an embodiment, the piece 100a can be cut from the light-weight, highly-conductive broad good 100 shown and described in conjunction with FIGS. 1-6. The piece 100a of light-weight, highly-conductive broad good is in direct electrical contact with the patch 810 and the exposed portion 804 of the ECF 800 surrounding the hole 802, and advantageously forms a low impedance, i.e., both low resistance and low inductance, electrical connection between the patch 810 and the ECF 800 through the metal coating that forms a highly-conductive network that follows the shape of the plurality of fibers in the veil.

Referring also to FIG. 10, once the ECF patch 810 has been fit into the hole 802 and the piece of light-weight, highly-conductive material 100a placed over the patch 810, to electrically interconnect the ECF patch 810 and the ECF 800 (the ECF patch 810 and the piece of light-weight, highly-conductive material 100a shown in dashed lines for purposes of illustration), the method continues with repairing any composite, i.e., carbon fiber and resin; applying any filler, as needed; and priming and painting the outer surface to complete the repair.

Referring now back to FIGS. 2-6, a metal coating 210 is formed over, envelopes, covers, or coats at least a portion, or substantially all, of the surface of the plurality of bound fibers 204 of the veil 202, or at least a portion, or substantially all, of both the surface of the plurality of bound fibers 204 and the binder material 206 of the veil. In an embodiment, the metal coating 210 preferably covers the entire surface of both the plurality of bound fibers 204 and the binder material 206. It will be understood that the metal coating 210 need not necessarily cover all of the veil 202, but that it should provide uniform conductivity. However, by covering at least a portion, or substantially all of the fibers 204 or the entire surface of both the fibers 204 and the binder material 206, the metal coating 210 forms a highly-conductive network 212 having low resistivity or a low sheet resistance, that follows the shape of the plurality of fibers 204 in the veil 202. In an embodiment, the sheet resistance of the broad good 100 or material is in a range from at least 0.5 ohms per square ($\Omega/\square$) up to $2\Omega/\square$.

Figure 3:
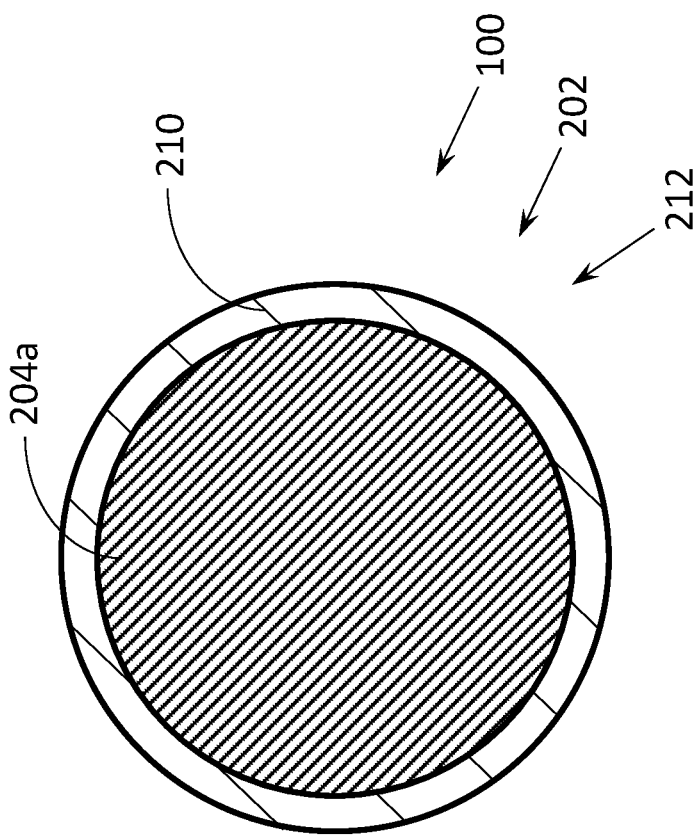
FIG. 3 is a cross sectional view of a carbon fiber taken along section line 3-3 shown in FIG. 2.

FIG. 3 illustrates a cross section of a metal-coated carbon fiber 204a. In an embodiment, the fiber 204a can be part of the nonwoven carbon fiber veil 202 and the metal coating 210 part of the highly-conductive network 212 comprising the light-weight, the broad good 100.

Figure 4:
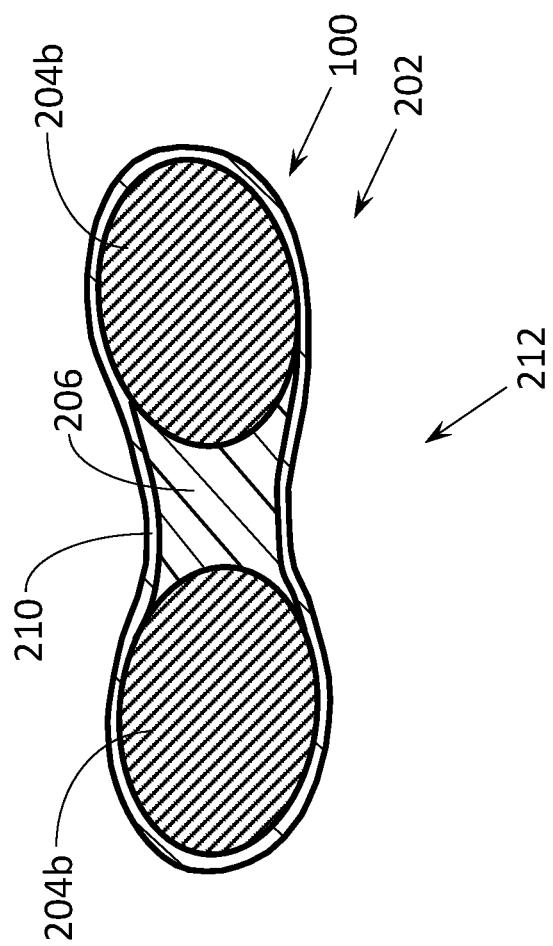
FIG. 4 is a cross sectional view of two carbon fibers, bound by a binder material that are not in physical contact with each other in a nonwoven carbon fiber veil, taken along section line 4-4 shown in FIG. 2.

Referring now to FIG. 4, two metal-coated fibers 204b that are not in direct physical contact with each other but bound together by the polymeric binder 206 in the veil 202 are shown. In accordance with the present invention and as will be appreciate by those skill in the art from the teachings contained herein, the metal coating 210 coats the binder material 206 and forms an electrically conductive pathway or bridge over the polymeric binder 206 and between the two metal-coated carbon fibers 204b. The metal coating 210 over the binder material 206 can also form a portion of the highly-conductive network 212.

Figure 5:
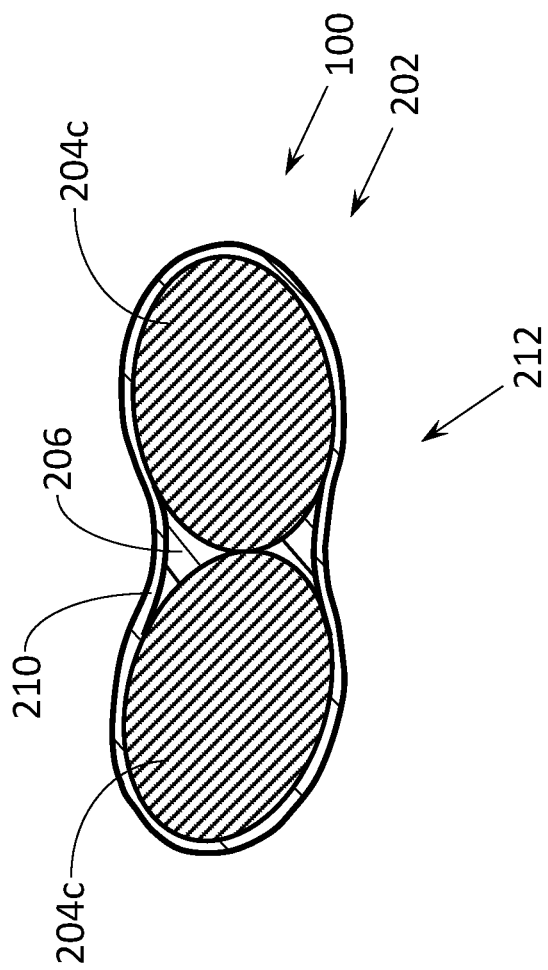
FIG. 5 is a cross sectional view of two carbon fibers, bound by a binder material that are in physical contact with each other in the nonwoven carbon fiber veil, taken along section line 5-5 shown in FIG. 2.

Referring now to FIG. 5, two metal-coated carbon fibers 204c that are in direct physical contact with each other and bound together by the binder material 206 in the veil 202 are shown. In accordance with the present invention and as will also be appreciate by those of skill in the art from the teachings also contained herein, the metal coating 210 forms an electrically-conductive pathway over the binder material 206 and between the two metal-coated carbon fibers 204c that are in physical contact with each other and bound together by the binder material 206. Again, the metal coating 210 over the binder material 206 can also form a portion of the highly-conductive network 212.

Figure 6:
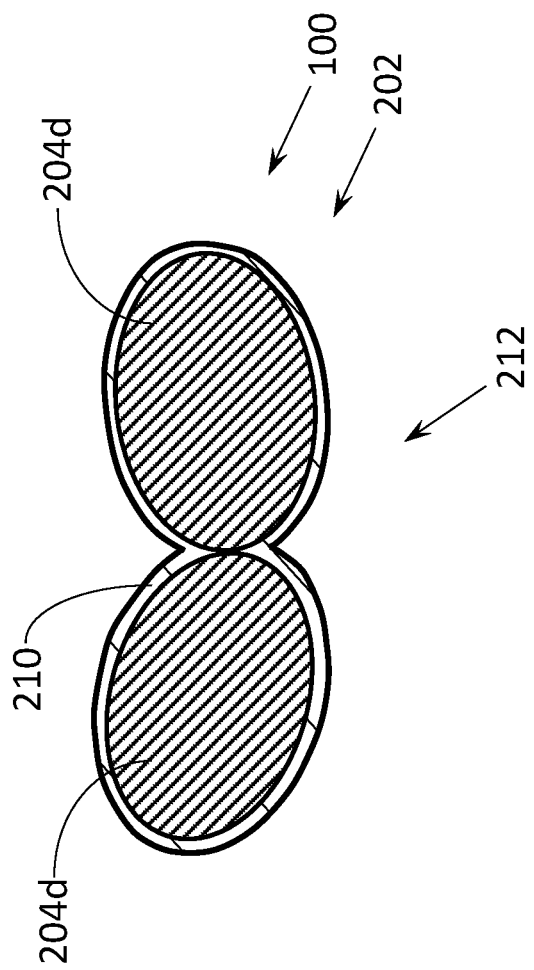
FIG. 6 is a cross sectional view of two carbon fibers, that are in physical contact with each other in the nonwoven carbon fiber veil but not bound together by a binder material, taken along section line 6-6 shown in FIG. 2.

Referring now to FIG. 6, two metal-coated fibers 204d that are in direct physical contact with each other but not bound together by the binder material 206 are shown. In accordance with the present invention and as will be further appreciate by those of skill in the art from the teachings likewise contained herein, the metal coating 210 can still envelope or cover the two metal coated carbon fibers 204d that are in physical contact with each other but not bound together by the binder material 206.

Thus, as shown in and described in conjunction with FIGS. 2-6, the metal coating 210 forms a highly-conductive network 212 that follows the shape of the plurality of fibers 204a-d in the veil 202.

The processes of electroless plating (EL) and/or electroplating (EP), or a combination thereof, can be used to coat the veil 202 with the metal coating 210. An article entitled *Tin-Palladium Catalysts for Electroless Plating* by Gerald A. Krulik, Gerald A. Krulik, Tin-Palladium Catalysts for Electroless Plating, 26 Platinum Metals Review 58-64 (1982), details a process for EL plating and is incorporated herein by reference in its entirety. In an embodiment, the veil 202 can be an approximately 7 gsm nonwoven carbon fiber veil, and the metal coating 210 can comprise an EL plated nickel with a basis weight in a range of at least 3 gsm, up to 5 gsm, the areal weight of the broad good 100 or the material in a range from at least 5 gsm, up to 12 gsm, and the sheet resistance of the broad good 100 or the material in a range from at least 0.5 ohms per square ($\Omega/\square$), up to $2\Omega/\square$.

Those of skill in the art will appreciate that other metals can be used without departing from the spirit of the present invention. In one embodiment, a metal that exhibits excellent electrical conductivity and ductility is preferred for the metal coating 210. Excellent electrical conductivity is associated with low resistivity and greater current carrying capability and, thereby, increases the ability of the broad good 100 or the material to bridge a gap in a lightning strike protection layer or patch a hole in an ECF, for example. A more ductile metal is advantageous allowing the broad good 100 or the material to more readily follow complex contours in the repair of composite structures or panels forming the airframe or exterior skin, e.g., an engine cowl, fuselage, wings, etc., of an aircraft.

Some metals, such as copper, silver, some aluminums, certain alloys, and some steels, with excellent conductivity and ductility can galvanically interact with the carbon fiber in other layers of a composite structure or panel, compromising the structural strength of the carbon fiber. Some metals, such as copper, silver, some aluminums, certain alloys, and some steels, also tend to corrode in salt environments or corrode galvanically with carbon or oxidize almost instantly in air, which can increase their resistivity and, thereby, reduce and/or compromise the protection capability of the broad good 100 or the material. This can be of concern because broad good 100 or the material allows for the repair of a lightning strike protection layer in the finishing layer or outermost surface of a composite structure, such as an engine cowl or an airplane wing, where oxidation or corrosion is more likely to occur.

The present invention addresses this and other possible concerns through the selection and/or use of a metal coating 210 comprising a metal material that does not galvanically interact with the carbon fiber in other layers of a composite structure or panel. In one embodiment, there is no galvanic interaction between nickel and the carbon fiber in other layers of a composite structure. Nickel is also corrosion resistant in salt environments and does not oxidize readily in air. This allows for the use of the broad good 100 or the material including a metal coating 210 comprising nickel in the repair of a lightning strike protection system in the finishing layer or outermost surface of a composite structure, such as, for example, the intake cowl of an aircraft engine. Those of skill in the art will also appreciate that other metals may be used without departing from the spirit of the present invention.

Those of skill in the art will understand and be able to vary the metal used for, and the basis weight and/or thickness of, the metal coating 210 in each embodiment to vary the compatibility, ductility, resistivity and/or conductivity of the broad good 100 or the material. Further, a person of ordinary skill in the art can select a particular broad good in accordance with principles of the present invention for a particular application, such as the repair of a lightning strike protection system, such as, for example, in Zone 1A on intake cowl of an aircraft engine or on the leading edge of an airplane wing, based on either the resistance per square meter or the basis weight, or a combination thereof.

Further, although nickel is corrosion and wear resistant, nickel is not typically thought of as being particularly ductile. However, for example, nickel sulfamate based electroplated (EP) nickel is more ductile than nickel sulfate based electroplated (EP) nickel, i.e., Watts nickel, nickel sulfamate being similar to nickel sulfate except that one of the hydroxyl groups has been replaced by an amido group. See Milan Paunovic & Mordechay Schlesinger, MODERN ELECTROPLATING (2010), incorporated by reference herein in its entirety. In one embodiment, the metal coating 210 comprises a nickel-sulfamate based electroplated (EP) nickel.

Although FIGS. 2-6 and the accompanying description have detailed numerous embodiments of the present invention, several operative principles will be become apparent to those of skill in the art.

It is well understood by those of skill in the art that for a given fiber 204 size, the greater the basis weight of the veil 202, the greater the number or plurality of fibers 204 in a unit volume of the broad good 100 or the material, and the lesser the space between metal-coated fibers 204; thereby, in terms of shielding effectiveness, the greater the frequency bandwidth and/or the greater the highest frequency of shielding coverage provided by the broad good 100 or the material. Thus, with respect to shielding effectiveness, the relative spacing of the plurality of fibers 208 is what determines the shielding effectiveness at a particular frequency. In an embodiment, the basis weight of the veil 202 is approximately 7 gsm, the carbon fibers 204 are coated with nickel, the basis weight of the broad good 100 or material is at least 10 gsm, up to 12 gsm, and the shielding effect provided by the broad good 100 or material from 1-8.5 gigahertz (GHz) is at least about 40 decibels (dB), at least about 50 dB, at least about 60 dB, at least about 70 dB, up to about 80 dB.

Referring also to FIGS. 1-6, those of ordinary skill will also appreciate that, generally, as the basis weight of the metal coating 210 is increased in the broad good 100 or the material, the resistance across the width 104 and length 106, i.e., the sheet resistance in terms of ohms per square unit ($\Omega/\square$), of the broad good 100 or the material is decreased. Further, as the weight of the metal coating 210 is increased, the current carrying capability of the broad good 100 or the material is generally increased. This is particularly important in terms of providing protection as is the formation of aforementioned highly-conductive network. It will be appreciated that pragmatically, the thickness of the metal coating 210 is not used to specify the sheet resistance as described above as it is on the micron level, i.e., $10^{-6}$ meters, and is more difficult to readily measure. Rather, the measure is the relative weight per unit area of the metal coating 210; again, typically given in grams per square meter (g/m$^2$ or gsm). In an embodiment, the metal coating 210 comprising nickel, the basis weight of the metal coating is at least about 3 gsm, up to 5 gsm.

Referring once again to FIG. 1, as described, the light-weight, highly-conductive broad good 100 can be used in the repair of various primary and secondary structures in aerospace applications, such as composite structure or panels forming the airframe and/or exterior skin, e.g., engine cowl(s), fuselage, wings, etc., of an aircraft. Again, when used in these repairs, the light-weight, highly-conductive broad good 100 provides lightning-strike protection and/or shields associated avionics and electronics from external electromagnetic interference. When so used, the light-weight, highly-conductive broad good 100 channels lightning across the exterior surface of the aircraft protecting and/or shielding.

While various embodiments of a light-weight, highly-conductive broad good 100 or material suitable for use in repair have been illustrated by the foregoing description and have been described in considerable detail, it is not intended to restrict or in any way limit the scope of the appended claims to such detail. Additional advantages and modifications will become readily apparent to those skilled in the art.

What is claimed is:

1. A light-weight, highly-conductive material useful for repairing a lightning protection system in an aircraft, the material comprising:
   a nonwoven carbon fiber veil, the veil comprising:
      a plurality of carbon fibers looped randomly throughout the veil; and
      a binder material that binds the plurality of carbon fibers together forming the veil; and
   a metal coating covering the entire surface of both the plurality of bound fibers and the binder material;
      wherein the metal coating forms a highly-conductive network that follows the shape of the plurality of fibers in the veil;
      wherein the areal weight of the material is in a range from at least 5 grams per square meter (gsm), up to 12 gsm; and
      wherein the sheet resistance of the material is in a range from at least 0.5 ohms per square ($\Omega/\square$), up to 2$\Omega/\square$.

2. The material of claim 1, the material manufactured as a broad good and supplied as a sheet or a patch.

3. The material of claim 2, the sheet or the patch having a length and a width, the ratio between the length and width in a range from 0.5:1, up to 2:1.

4. The material of claim 1, the material manufactured and supplied as a broad good.

5. The material of claim 4, the broad good having a length and a width, the ratio of the length to the width defining an aspect ratio, the aspect ratio in a range from at least 10:1, up to 10,000:1.

6. The material of claim 4, the width of the broad good in a range from at least 12 inches (30.48 centimeters), up to 72 inches (182.88 centimeters).

7. The material of claim 1, wherein the areal weight of the nonwoven carbon fiber veil is approximately 7 gsm.

8. The material of claim 1, wherein each fiber has a diameter of at least about 1 micron, and up to about 10 microns, wherein each fiber has a length of at least 1 mm, and up to 10 mm, and wherein each fiber has an aspect ratio of about 10,000:1, down to about 1,000:1.

9. The material of claim 1, wherein the binder material comprises a polymeric binder.

10. The material of claim 1, wherein the binder material is a polystyrene-acrylic binder.

11. The material of claim 1, wherein the areal weight of the binder material within the material is at least 0.25 grams per square meter (gsm), up to 1.20 gsm.

12. The material of claim 1, wherein the metal coating is applied to the entire surface of both the plurality of bound fibers and the binder material through an electroless plating (EL) process.

13. The material of claim 1, the metal coating comprising nickel.

14. The material of claim 1, wherein the areal weight of the metal coating is at least 3 grams per square meter (gsm), up to 5 gsm.

15. The material of claim 1, wherein the metal coating comprises at least 30% by weight up to 42% by weight of the total mass of the material.

16. The material of claim 1, wherein the highly-conductive network provides a shielding effect of at least about 40 decibels (dB), up to about 80 dB, from 1-8.5 gigahertz (GHz).

17. The material of claim 1, wherein when applied to a surface of an aircraft and electrically coupled to a lightning-strike protection system located therein, the material provides at least one of:
   electrical continuity between a lightning-strike protection layer and a patch made to the lightning-strike protection layer;
   protection from a high intensity radiated field (HIRF); and
   protection from a lightning-strike to or proximate the aircraft.

18. The material of claim 1, wherein when applied to a surface of an aircraft, the material provides Zone 1A lightning-strike protection for the aircraft.

19. A method of repairing a lightning protection system in an aircraft that has sustained damage, the system comprising a carbon fiber composite structure including an expanded copper foil (ECF), the method comprising the steps of:
   removing at least one of paint, primer, resin and composite surrounding the damage to expose a portion of the ECF;
   cutting an ECF patch to fit the damaged area;
   inserting the ECF patch into the damaged area;
   placing a piece of the light-weight, highly-conductive material of claim 1 over the ECF patch and the exposed portion of the ECF surrounding the damage, the material forming a low impedance electrical connection between the ECF patch and the exposed portion of the ECF; and
   repairing any composite that was removed to expose the portion of the ECF.

20. The method of claim 19, wherein the damage was caused by a lightning strike.

* * * * *